United States Patent [19]

Raj et al.

[11] 4,252,353

[45] Feb. 24, 1981

[54] SELF-ACTIVATING FERROFLUID SEALS

[75] Inventors: Kuldip Raj, Medford, Mass.; Ronald Moskowitz, Merrimack; Raoul Casciari, Bedford, both of N.H.; Alvan F. Chorney, Stoughton, Mass.

[73] Assignee: Ferrofluidics Corporation, Nashua, N.H.

[21] Appl. No.: 33,466

[22] Filed: Apr. 26, 1979

[51] Int. Cl.³ .......................... F16J 15/16; F16J 15/40
[52] U.S. Cl. ........................................ 277/80; 277/135
[58] Field of Search ................... 277/80, 135, DIG. 7; 308/187.1, 187.2

[56] References Cited

U.S. PATENT DOCUMENTS

| | | | |
|---|---|---|---|
| 2,996,162 | 8/1961 | Lehde | 277/80 X |
| 3,740,060 | 6/1973 | Miskolczy et al. | 277/80 |
| 3,746,407 | 7/1973 | Stiles et al. | 277/80 X |
| 4,171,818 | 10/1979 | Moskowitz et al. | 277/80 |

FOREIGN PATENT DOCUMENTS

| | | | |
|---|---|---|---|
| 1956759 | 5/1971 | Fed. Rep. of Germany | 277/80 |
| 680233 | 10/1952 | United Kingdom | 277/80 |
| 420836 | 8/1974 | U.S.S.R. | 277/80 |

OTHER PUBLICATIONS

*Machine Design*, issue of Mar. 28, 1968, "Magnetic-Fluid Seals," Rosensweig et al., pp. 145-150.

*Primary Examiner*—Robert S. Ward, Jr.
*Attorney, Agent, or Firm*—Richard P. Crowley

[57] ABSTRACT

A self-activating seal is formed by inserting a magnetically permeable shaft into a module which comprises: a magnet, two pole pieces and a magnetic fluid. The module is so constructed that the magnet and pole pieces form a cavity for storing the magnetic fluid until the shaft or similar element is inserted. Upon insertion of the shaft, the magnetic field is altered and the flux path diverted to the small gaps separating the pole pieces and the shaft. The magnetic fluid is drawn to the gas to form hermetic seals.

26 Claims, 8 Drawing Figures

SELF-ACTIVATING FERROFLUID SEALS

BACKGROUND OF THE INVENTION

Seals employing a magnetic fluid have been used and are known to provide a positive hermetic barrier against gas and other contaminants independent of differential pressure or direction. Such magnetic fluid seals are further characterized by their long life, high reliability, low or immeasurable discharge and cost effectiveness in many rotary shaft systems. Pioneering work in the field of magnetic fluid seal apparatus and particularly multistage seals was disclosed in U.S. Pat. No. 3,620,584, issued on Nov. 16, 1971, hereby incorporated by reference. Additionally, U.S. Pat. No. 3,917,538, issued on Nov. 4, 1975, also incorporated by reference, revealed novel compositions and methods of making magnetic fluids, also known as ferrofluids, having excellent magnetic characteristics. Ferrofluid seals operate in principle through the use of ferrofluid in a gap between rotary and stationary surfaces in the presence of a magnet to provide focused radial magnetic flux lines which retain the ferrofluid, for example, in a liquid "O-ring" in the gap about a rotating shaft.

Magnetic fluid exclusion seals have recently found usage in computer magnetic-disc-storage units to prevent contaminants from reaching the disc area. Computer disc drives typically employ a magnetic fluid-type exclusion seal module encased in a stationary nonmagnetic housing to prevent the ingression of airborne or other particulates and vapors up and around the disc-drive shaft.

In computer disc-drive applications, the seal module comprises: a permanent ring magnet polarized axially, a pair of magnetically permeable pole elements which sandwich the magnet and a magnetic fluid. Typically the seal is magnetically isolated from the disc memory to prevent the seal low-strength magnetic field from interfering with the information stored on the disc. The seal is assembled about the rotary disc shaft so that the inner peripheral ends of the pole pieces form a gap with the shaft surface; i.e., 4-8 mils. A magnetic fluid is then painted or otherwise applied in the gaps to form a liquid "O-ring" seal which completes the magnetic flux circuit with the magnetically permeable disc shaft.

Presently, in most computer disc-drive applications as well as other applications the housing with magnet and pole pieces encased therein is purchased as a unit; however, the user must purchase and apply the magnetic fluid at the time of installing the seal about the shaft. Application of the magnetic fluid by the user presents a number of difficulties. The fluid is expensive and sometimes difficult to obtain in small quantities. As with other fluids, leakage during storage must be avoided. Additionally, application of the magnetic fluid requires a certain amount of skill and it is difficult to determine when the correct amount of magnetic fluid has been applied. Thus, it would be most desirable for magnetic fluid exclusion seals to be self activating or to avoid problems associated with the addition of ferrofluid at the point of assembly.

SUMMARY OF THE INVENTION

This invention relates to an improved hermetic seal between a movable element, such as a shaft, and a stationary element, such as a housing, as well as the process of manufacturing such seal apparatus and the method of using it. In particular, this invention concerns self-activating, time-controlled, magnetic fluid or ferrofluid exclusion seals, their manufacture and use. More particularly, a self-activating magnetic fluid seal is disclosed for use in computer disc-drive systems.

The self-activating seal of this invention is formed by inserting a magnetically permeable shaft or similar element into a module which comprises: a magnet, two pole pieces and a magnetic fluid. The seal module is so constructed that the magnet and pole pieces are affixed to each other in a fluid-tight manner and form a cavity for storing the magnetic fluid until the shaft or similar element is inserted. Upon insertion of the shaft the magnetic field is altered and the flux path diverted to the small gaps separating the pole pieces and shaft. The magnetic fluid is drawn to the gaps to form "O-ring" hermetic seals.

Such hermetic "O-ring" seals are particularly useful in sealing computer memory disc areas from contaminants originating from inside the spindle. Because the disc in a magnetic disc-drive computer whirls at speeds up to 6000 RPM and is separated from the read/write head by clearances of 0.000100 to 0.000050 inch, even the smallest particles can result in a "crash" between the head and the disc, thus causing a loss of information and/or damage to the components. In such applications the module of this invention may be assembled between the driving means and the magnetic disc, in particular between the top bearing and the disc, and activated by the insertion of the disc-drive shaft. Once activated, the magnet and pole pieces remain stationary with the gap between the pole pieces and shaft filled with magnetic fluid sealant, thus creating a sterile environment in which the disc and head may operate.

The principle of operation of the self-activating seal is based upon the alteration of a magnetic field by the presence of a magnetically permeable material and reorientation of magnetic fluid as a result of the altered magnetic field. In the absence of other magnetically permeable material, the module of this invention generates a characteristic magnetic flux path which runs from one pole of the magnet through the adjacent pole piece, across the cavity, through the other pole piece and returns to the other pole of the magnet. While, in theory, numerous flux paths exist throughout the space surrounding the magnet, in practice the nearly exclusive flux path is the path of least reluctance; i.e., the path through the cavity. Under this regime the magnetic fluid within the cavity has no impetus to leave the cavity and, in actuality, it has been found that the fluid will be attracted to the corners of the cavity closest to the poles of the magnet. If, however, another magnetically permeable member is introduced to the module, the path of least reluctance is altered. When a magnetically permeable shaft is inserted into the module, the magnetic field and flux path are altered, such that a nearly closed magnetic circuit or flux path is formed by the pole pieces and the shaft. In this situation the magnetic fluid is quickly drawn into the gaps between the pole pieces and shaft and held there, effectively sealing the gaps.

The advantage of the self-activating seal apparatus disclosed herein over the prior art lies in the elimination of laborious steps of painting or otherwise applying magnetic fluid to the pole pieces of a module prior to the insertion of a shaft therein. The user may purchase a single ready-to-use unit; handling and storage of fluid by the user are eliminated. Economy of manufacture and assembly is therefore achieved.

In the most preferred embodiment the cavity is sealed by a nonmagnetic annular storage ring containing two holes 180° apart with plugs or similar device; i.e., tape. The ring is set into grooves in the pole pieces in a fluid-tight manner. The holes in the storage ring provide access to inject fluid into the cavity using a syringe or similar device. After injection the holes are plugged, allowing the preassembled modules to be shipped long distances without any risk of fluid leakage under shock and vibration and due to the presence of other magnetic seals around this seal or contamination. At the point of usage the plugs are removed and the module installed on the shaft and secured in place. The magnetic fluid will then migrate to fill the gap at a rate depending on the size and number and location of holes in the storage ring. In practice it has been found that at least two holes are preferred so that one may act as a vent during injection.

For purposes of illustration only, our invention will be described in connection with the preferred embodiment; however, it is recognized that various changes and modifications may be made by those skilled in the art, all within the spirit and scope of the invention. For example, this invention may be practiced with or without the storage ring of the preferred embodiment. The ring may also be replaced by other fluid storage devices, such as a plastic tube having holes similarly fitted with plugs, slits sealed by tape or other fluid-releasing means. Further, it should be apparent that while the invention has been described in connection with single-stage pole pieces, the invention has applicability to multi-stage seal apparatus.

Additionally, this invention may be practiced as a single pole piece magnetic seal wherein the magnetic fluid migrates from a position nearer the magnet in the absence of the shaft to the gap between the single pole piece and shaft upon insertion of the shaft. In such applications the magnetic flux travels in a relatively diffuse manner from the shaft back to the magnet and consequently a stronger field-strength magnet may be necessary.

It is also obvious that while this invention has been described as a seal apparatus, the invention may also be practiced where magnetic fluids are used for their lubricating or vibration-damping characteristics instead of their sealing properties. Finally, it should be noted that although the examples discussed refer to rotatable shafts and tubes, the invention is not so limited, being applicable also to sliding, oscillating or reciprocating shafts or members of any cross-sectional shape or to a continuously moving member being fed through a seal.

DESCRIPTION OF THE EMBODIMENTS

Figure 1:
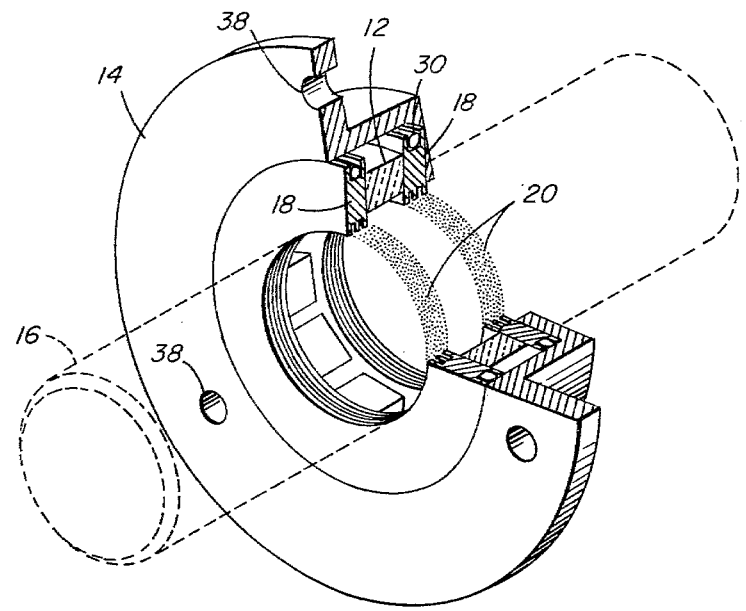
FIG. 1 is a perspective view of a prior-art magnetic fluid seal between a housing and a shaft.

Referring to FIG. 1 there is shown a prior-art magnetic seal apparatus 10 wherein a module consisting of a ring magnet 12, axially affixed pole pieces 18, and magnetic fluid 20, has been formed within a flanged housing 14 surrounding a magnetically permeable shaft 16. The module is affixed to the housing by two static seals 30 located on the outer peripheral edges of the two pole pieces 18. These static seals or "O-rings" 30 engage the inner peripheral wall of the housing in a fluid-tight manner.

In such an apparatus the housing 14 is composed of a nonmagnetic material, such as aluminum, and the shaft 16 composed of a material that is capable of being magnetized, such as steel. The housing 14 is mounted through bolt hole 38 to other apparatus (not shown) to provide a stationary support for the magnetic module. The shaft is driven by a motor or other means (not shown).

The pole pieces 18 are arranged so that a small clearance exists (0.01 to 0.02 cm.) between the pole pieces and the shaft. In FIG. 1 each of the inner peripheral ends of the pole pieces 18 projects a plurality of edges into the gap between the pole piece and shaft to effectuate a multi-stage seal. Typically the pole pieces are constructed of stainless steel.

The magnet 12, which is contained between the two pole pieces, may be composed of any one of a number of different permanent magnet materials, ranging from low-energy ceramics to high-energy Alnico series alloys, samarium cobalt, mischmetal and other rare earth alloys.

Magnetic fluids used in such apparatus most often comprise: a magnetic solid, such as magnetite, a surface-active stabilizer (usually a mono-unsaturated fatty acid) and a carrier liquid (for example, water, hydrocarbons or fluorocarbons). An excellent magnetic fluid known not only for its magnetic properties but also for its stability, lubricating properties and vibration damping characteristics is the DO4 Ferrofluid, manufactured by Ferrofluidics Corporation of Burlington, Massachusetts and rated at 450 gauss and 750 centipoise.

Figure 2:
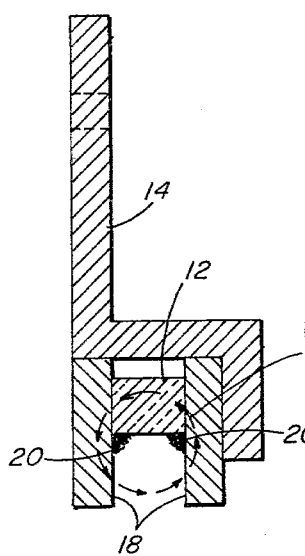
FIG. 2 is a cross-sectional view of a housing and sealing module having single-stage pole pieces, showing the magnetic flux path when no shaft is present.
Figure 3:
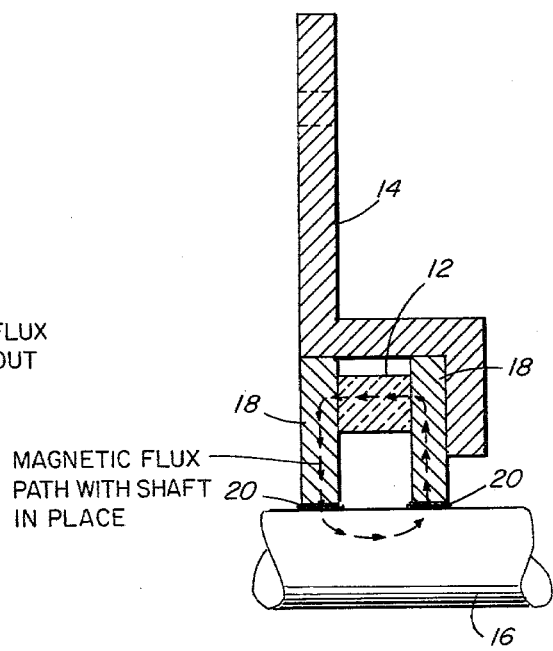
FIG. 3 is a cross-sectional view of a housing and sealing module having single-stage pole pieces showing the magnetic flux path when the shaft is in place.

With reference to FIGS. 2 and 3 the invention is shown in its simplest form (not to scale). In FIG. 2 a ferrofluid 20 is retained within a module cavity formed by single-stage pole pieces 18 and a magnet 12. The attraction of fluid 20 for the magnet 12 is such that the fluid is held captive at the inner corners of the cavity. The magnetic flux path in the absence of a magnetically permeable shaft is shown by the dashed lines of FIG. 2. The flux lines are predominantly concentrated in the cavity with little or no detectable flux leaving the inner peripheral ends of the pole pieces.

FIG. 3 shows the alteration of the flux path when the shaft 16 is inserted. Under this regime the predominant flux path now runs across the gaps between the inner peripheral ends of the pole pieces 18 and the shaft 16 and the magnetic fluid 20 has migrated to fill the gaps.

Figure 4:
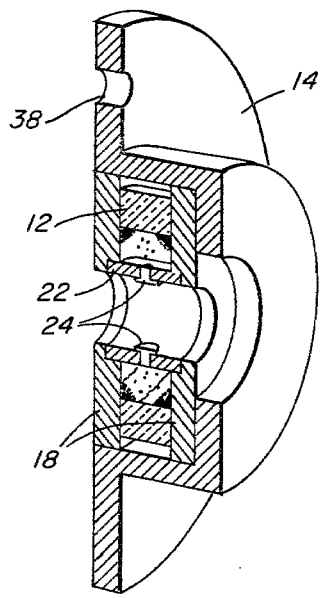
FIG. 4 is a partial cut-away perspective view of a housing and seal module employing a magnetic fluid storage ring.

In FIG. 4, the preferred embodiment is shown. The magnetic module comprising: the annular magnet 12, the annular single-stage pole pieces 18 and the magnetic fluid 20, is affixed in a fluid-tight manner to the housing 14 and a thin, flat storage ring 22 of nonmagnetic material, such as aluminum or plastic, is affixed in a similar fluid-tight manner to a groove in the pole pieces 18. The ring 22 is installed in the grooves with any suitable adhesive or sealant to provide mechanical rigidity as well as leak-free interfaces between ring 22 and the pole pieces 18. Two holes 26 and 28 located at the center in the storage ring 22 spaced 180° apart and fitted with plugs 24 are also shown. In practice, holes of 70-80 mils diameter are preferred.

Figure 5:
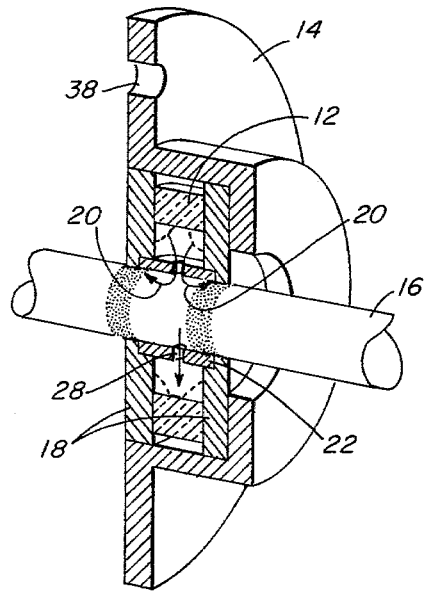
FIG. 5 is a partial cut-away perspective view of a housing and seal module showing migration of the magnetic fluid upon introduction of a magnetically permeable shaft.

In FIG. 5 the plugs 24 have been removed from the holes 26 and 28 and a shaft 16 has been inserted into the module. A schematic illustration of the migration of the magnetic fluid 20 from its previous position (depicted by the dotted lines) to the sealing position is shown. In this schematic view, hole 26 acts as a releasing means and hole 28 acts as a vent. In actual practice, both holes may vent at the same time as they release fluid.

Figure 6:
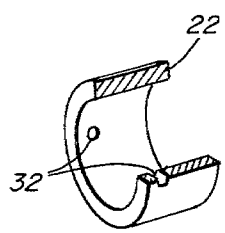
FIGS. 6-8 are partial cut-away perspective views of alternate storage ring configurations.
Figure 7:
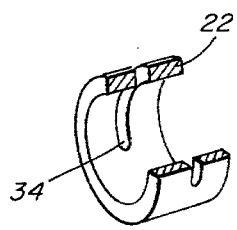
Figure 8:
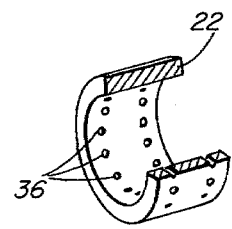

FIG. 6 shows a modification of the invention wherein the holes 32 in the storage ring 22 have been offset from the center of the ring so as to be closer to one pole piece than the other. FIG. 7 shows a second modification to the storage ring 22 wherein the holes have been replaced by slits 34, and FIG. 8 shows a modified ring 22 with a plurality of small holes 36.

In operation the preferred embodiment is manufactured as a ready-to-use unit. As the module is being assembled the storage ring 22 is affixed between the pole pieces 18. The cavity is filled with the predetermined amount of magnetic fluid 20 necessary to form the seal, using a syringe or similar device, and then sealed by plugs 24 or tape. At the point of use the plugs 24 or tape is removed, the housing 14 with the affixed module is placed on the shaft 16 and the housing 14 then bolted through holes 38 into a stationary position.

Once the module is in place around the shaft 16 the alteration of the magnetic flux distribution causes the fluid 20 to come out of the hole 26 and fill the gaps between the pole pieces 18 and the shaft 16. The rate at which the fluid fills the gaps depends on the radial gap size, which in most cases will vary from 4 to 8 mils. For example, it has been found that for a 6-mil gap and 78-mil diameter holes, the full pressure capacity of the single-stage seals was realized in about 4 minutes. With a gap of 8 mils and 78-mil diameter holes, the single-stage seal reached its maximum pressure capacity in about 20 minutes. Other parameters that can be varied to affect the flow rate are the hole size, the number of holes, the amount of ferrofluid in the cavity, the choice of permanent magnet, and the width of the pole piece. Further, the stage of one pole piece can be preferentially filled over the other by not positioning the hole equidistant from both pole pieces, as shown in FIG. 6.

What is claimed is:

1. A self-activating seal apparatus adapted for use with and to seal a magnetically permeable shaft element, which seal apparatus comprises:
   (a) a permanent magnet ring element having poles of opposite magnetic polarity and generally disposed to be aligned axially about the shaft element;
   (b) first and second magnetically permeable pole pieces, each at the one end disposed in a magnetic relationship with one pole of the permanent magnet ring element, and each disposed at the other end to extend into a close noncontacting relationship with the surface of the shaft element and to form a small gap with the surface of the shaft element, upon the insertion of the shaft element;
   (c) the first and second pole pieces and the ring element forming a partially empty, generally annular, storage cavity therebetween, through which empty storage cavity the magnetic flux of the ring element is concentrated in the absence of the shaft element; and
   (d) a defined sealing volume of ferrofluid in the storage cavity, which volume is less than the volume of the storage cavity, the ferrofluid retained by the magnetic flux path within the storage cavity in a stored position generally adjacent to the intersection of the first and second pole pieces at the one end and the poles of the ring element,
   whereby, on insertion of the shaft element within the seal assembly and the alteration of the magnetic flux path to the other end of the pole pieces, the defined volume of the stored ferrofluid is transported from the stored position to a sealing position at the gaps between the other end of the pole pieces and the surface of the shaft element.

2. The seal apparatus of claim 1 which includes:
   (a) nonmagnetic means to seal the cavity to prevent the premature dislodgement of the ferrofluid from the stored position, prior to insertion of the shaft element; and
   (b) means to penetrate the sealing means prior to use, to permit the ferrofluid to move from the stored position in the cavity to the sealing position.

3. The seal apparatus of claim 2 wherein the sealing means comprises a nonmagnetic sealing ring element extending generally between the other end of the first and second pole pieces, and the sealing ring element is characterized by at least one passageway therein, to permit the movement of the ferrofluid from the stored position through the passageway to the sealing position.

4. The seal apparatus of claim 3 wherein the means to penetrate the sealing means comprises removable means to seal the passageway.

5. The seal apparatus of claim 3 wherein the sealing ring element is characterized by at least two passageways, the passageways positioned about 180° apart.

6. The seal apparatus of claim 3 wherein the sealing ring element is characterized by a plurality of passageways therein, at least one of the passageways nonsymmetrically disposed, to permit preferential filling of one of the gaps by ferrofluid from the nonsymmetrical passageways.

7. The seal apparatus of claim 3 which includes removable means to seal the passageway prior to installation of the seal apparatus.

8. The seal apparatus of claim 2 which includes a nonmagnetic housing element adapted to secure the seal apparatus in a stationary position, while the shaft member rotates within the seal apparatus.

9. The seal apparatus of claim 3 which includes a computer disc shaft element positioned within the seal apparatus, with the ferrofluid in a sealing position in the gaps between the other ends of the pole pieces and the surface of the shaft element.

10. A computer disc seal assembly which includes:
    (a) a driving means;
    (b) a magnetically permeable shaft element rotated by the driving means;
    (c) a computer memory disc element secured for rotation to the shaft element; and
    (d) a seal apparatus of claim 1 disposed between the driving means and the computer memory disc element, the shaft element passing through and in a sealing relationship with the seal apparatus.

11. A self-activating seal apparatus adapted for use with and to seal a magnetically permeable shaft element, which seal apparatus comprises:
   (a) a permanent magnet ring element having poles of opposite magnetic polarity and generally disposed to be aligned axially about the shaft element;
   (b) first and second magnetically permeable pole pieces, each at the one end disposed in a magnetic relationship with one pole of the permanent magnet ring element, and each disposed at the other end to extend into a close noncontacting relationship with the surface of the shaft element, to form a small gap with the surface of the shaft element, upon the insertion of the shaft element;
   (c) the first and second pole pieces and the ring element forming a generally annular storage cavity therebetween, through which storage cavity the magnetic flux of the ring element is concentrated in the absence of the shaft element;
   (d) a defined sealing volume of ferrofluid in the storage cavity, the ferrofluid retained by the magnetic flux path within the storage cavity in a stored position;
   (e) nonmagnetic sealing means to retain the defined sealing volume of ferrofluid within the cavity in a stored position; and
   (f) means to open the sealing means prior to insertion of the shaft element, to permit the ferrofluid to move from the stored position to the sealing position, whereby, on insertion of the shaft element within the seal assembly and the alteration of the magnetic flux path to the other end of the pole pieces, the defined volume of the stored ferrofluid is transported from the stored position to a sealing position at the gaps between the other end of the pole pieces and the surface of the shaft element.

12. The seal apparatus of claim 11 wherein the nonmagnetic sealing means comprises:
   (a) a nonmagnetic sealing ring element extending generally between the other end of the first and second pole pieces, the sealing ring element characterized by at least one passageway therein to permit movement of the ferrofluid from the stored position in the cavity to the sealing position; and
   (b) removable means to seal and to open the passageway prior to insertion of the shaft element.

13. The seal apparatus of claim 11 wherein the sealing ring element is characterized by at least two passageways, the passageways positioned about 180° apart.

14. The seal apparatus of claim 11 wherein the sealing ring element is characterized by a plurality of passageways therein, at least one of the passgeways nonsymmetrically disposed, to permit perferential filling of one of the gaps by ferrofluid from the nonsymmetrical passageways.

15. The seal apparatus of claim 11 which includes a computer disc shaft element positioned within the seal apparatus, with the ferrofluid in a sealing position in the gaps between the other ends of the pole pieces and the surface of the shaft element.

16. A computer disc seal assembly which includes:
   (a) a driving means;
   (b) a magnetically permeable shaft element rotated by the driving means;
   (c) computer memory disc element secured for rotation to the shaft element; and
   (d) a seal apparatus of claim 11 disposed between the driving means and the computer memory disc element, the shaft element passing through and in a sealing relationship with the seal apparatus.

17. A method of sealing a hermetic, movable, magnetically permeable, shaft element and a stationary seal apparatus, which seal apparatus comprises a permanent magnet ring element and first and second magnetically permeable pole pieces, each at the one end disposed in a magnetic flux relationship with the magnet ring element, and each adapted to be disposed at the other end into a close noncontacting relationship with the surface of the shaft element, the magnet ring element and the pole pieces forming a storage cavity therebetween for ferrofluid, which method comprises:
   (a) retaining a defined sealing volume of ferrofluid within the cavity by the magnetic flux path of the magnet ring element concentrated in the cavity, the ferrofluid retained in a stored position generally adjacent the intersection of the magnet ring element and the first and second pole pieces; and
   (b) transporting the sealing volume of the ferrofluid from the stored position through the cavity and into a sealing position and relationship between the other ends of the pole pieces and the surface of the shaft element, when the shaft element is inserted within the seal apparatus and the magnetic flux path altered to concentrate magnetic flux at the gaps between the other end of the pole pieces and the surface of the shaft element.

18. The method of claim 17 which includes transporting the ferrofluid from the stored position through an empty cavity to the sealing position.

19. The method of claim 17 which includes:
   (a) sealing the cavity prior to insertion of the shaft element, to retain the ferrofluid therein prior to use; and
   (b) unsealing the cavity just prior to insertion of the shaft element.

20. The method of claim 19 which includes a sealing means having a plurality of passageways therein, which passageways are opened just prior to insertion of the shaft element, to permit the stored ferrofluid to move from the stored position to the sealing position through the passageways.

21. The method of claim 17 which includes inserting into and within the seal apparatus a rotatable drive shaft element of a computer disc drive.

22. The method of claim 17 which includes sealing the cavity by a nonmagnetic sealing ring member secured in a fluid-tight manner and extending across the other ends of the pole pieces, the sealing ring member having at least one passageway therein for the passage of the ferrofluid, and sealing the passageway prior to insertion of the shaft element and transporting of the ferrofluid.

23. The method of claim 22 which includes providing at least two passageways in the sealing ring member at about 180° apart and unsealing the passageways prior to use.

24. The method of claim 17 which includes forming the sealing relationship by inserting the shaft element and rotating the shaft element to form the ferrofluid into a sealing relationship.

25. The method of claim 17 which includes forming the sealing relationship of the ferrofluid against the surface of a rotating shaft element of a computer disc drive, the sealing relationship formed between a driving means of the shaft element and a driven computer memory disc element.

26. A method of sealing hermetically a magnetically permeable shaft element with a seal apparatus which comprises a permanent magnet ring element disposed to surround the shaft element and first and second magnetically permeable pole pieces, which pole pieces at the one end are in a magnetic flux relationship with the ring element and at the other end extend into a close noncontacting relationship with the surface of the shaft element, the ring element and pole pieces forming a cavity therebetween, in which cavity the magnetic flux of the ring element is concentrated prior to insertion of the shaft element, the method which comprises:

(a) sealing a defined sealing volume of ferrofluid within the cavity by nonmagneitc sealing means in a stored position;

(b) unsealing the sealed defined volume of ferrofluid prior to insertion of the shaft element; and (c) inserting the shaft element to alter the magnetic flux path to concentrate the magnetic flux at the gaps between the other ends of the pole pieces and the surface of the shaft element, and to provide for the movement of the unsealed defined volume of the ferrofluid from the stored position to the sealing position at the gaps, whereby, upon rotation of the shaft element, a sealing ring of ferrofluid is formed at the gaps.

* * * * *